United States Patent
Ninan et al.

(10) Patent No.: US 10,305,723 B1
(45) Date of Patent: May 28, 2019

(54) METHODS AND APPARATUS FOR SELECTING A READ MECHANISM

(75) Inventors: Anoop George Ninan, Milford, MA (US); Samuil Shmuylovich, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1569 days.

(21) Appl. No.: 11/540,106

(22) Filed: Sep. 29, 2006

Related U.S. Application Data

(63) Continuation-in-part of application No. 11/476,478, filed on Jun. 28, 2006.

(51) Int. Cl.
*H04L 12/24* (2006.01)

(52) U.S. Cl.
CPC .................................. *H04L 41/028* (2013.01)

(58) Field of Classification Search
CPC ...................................................... H04L 41/028
USPC .......................... 709/223, 224, 246; 707/201
See application file for complete search history.

(56) References Cited

U.S. PATENT DOCUMENTS

| | | | |
|---|---|---|---|
| 6,122,639 A * | 9/2000 | Babu et al. | 707/103 R |
| 6,226,788 B1 * | 5/2001 | Schoening et al. | 717/107 |
| 6,308,178 B1 * | 10/2001 | Chang et al. | 707/100 |
| 6,738,975 B1 * | 5/2004 | Yee et al. | 719/310 |
| 6,938,055 B2 * | 8/2005 | Iida et al. | 707/201 |
| 6,957,234 B1 * | 10/2005 | Steinbach | 707/201 |
| 7,197,489 B1 * | 3/2007 | Gauvin et al. | 707/1 |
| 7,356,576 B2 * | 4/2008 | Rabe | 709/221 |
| 7,464,147 B1 * | 12/2008 | Fakhouri et al. | 709/223 |
| 2003/0093509 A1 * | 5/2003 | Li et al. | 709/223 |
| 2003/0149763 A1 * | 8/2003 | Heitman et al. | 709/224 |
| 2003/0177239 A1 * | 9/2003 | Shinohara et al. | 709/226 |
| 2004/0064545 A1 * | 4/2004 | Miyake | 709/224 |

* cited by examiner

*Primary Examiner* — Philip J Chea
*Assistant Examiner* — Robert B McAdams
(74) *Attorney, Agent, or Firm* — Krishnendu Gupta

(57) ABSTRACT

A system receives managed resource data collected by an agent from a managed resource in a storage area network. The system evaluates conditions associated with the managed resource data to select a read mechanism based on the conditions, and applies the read mechanism to read managed object data from the managed object database. The managed object data corresponds to the managed resource data. After application of the read mechanism, the system synchronizes the managed object data from the managed object database with the managed resource data collected from the managed resource.

17 Claims, 10 Drawing Sheets

---

216 EVALUATE CONDITIONS ASSOCIATED WITH THE MANAGED RESOURCE DATA TO SELECT A READ MECHANISM BASED ON THE CONDITIONS

217 DETERMINE THAT THE MANAGED RESOURCE DATA, RECEIVED FROM THE AGENT, IS COMPRISED OF A PLURALITY OF PARTITIONS

218 IDENTIFY THAT EACH OF THE PLURALITY OF PARTITIONS HAS AN ASSOCIATED LOGICAL PARTITION NUMBER

219 IDENTIFY THAT THE MANAGED OBJECT DATA WITHIN THE MANAGED OBJECT DATABASE HAS A LOGICAL PARTITION NUMBER THAT CORRESPONDS TO THE LOGICAL PARTITION NUMBER ASSOCIATED WITH EACH OF THE PLURALITY OF PARTITIONS

216 EVALUATE CONDITIONS ASSOCIATED WITH THE MANAGED RESOURCE DATA TO SELECT A READ MECHANISM BASED ON THE CONDITIONS

217 DETERMINE THAT THE MANAGED RESOURCE DATA, RECEIVED FROM THE AGENT, IS COMPRISED OF A PLURALITY OF PARTITIONS

218 IDENTIFY THAT EACH OF THE PLURALITY OF PARTITIONS HAS AN ASSOCIATED LOGICAL PARTITION NUMBER

219 IDENTIFY THAT THE MANAGED OBJECT DATA WITHIN THE MANAGED OBJECT DATABASE HAS A LOGICAL PARTITION NUMBER THAT CORRESPONDS TO THE LOGICAL PARTITION NUMBER ASSOCIATED WITH EACH OF THE PLURALITY OF PARTITIONS

*FIG. 7*

220 EVALUATE CONDITIONS ASSOCIATED WITH THE MANAGED RESOURCE DATA TO SELECT A READ MECHANISM BASED ON THE CONDITIONS

221 DETERMINE A TYPE OF AN INSTANCE ADAPTER, THE INSTANCE ADAPTER ASSOCIATED WITH AN ADAPTER ASSOCIATED WITH THE MANAGED RESOURCE DATA, THE INSTANCE ADAPTER OPERATING AS A CONTAINER FOR THE MANAGED RESOURCE DATA

222 IDENTIFY THE TYPE OF INSTANCE ADAPTER AS AN ADDITIONAL INSTANCE ADAPTER OPERATING AS A CONTAINER FOR ADDITIONAL MANAGED RESOURCE DATA REQUIRED FOR SYNCHRONIZATION OF THE MANAGED OBJECT DATA FROM THE MANAGED OBJECT DATABASE WITH THE MANAGED RESOURCE DATA COLLECTED FROM THE MANAGED RESOURCE

*FIG. 8*

228 APPLY THE READ MECHANISM TO READ MANAGED OBJECT DATA FROM THE MANAGED OBJECT DATABASE, THE MANAGED OBJECT DATA CORRESPONDING TO THE MANAGED RESOURCE DATA

229 OBTAIN MANAGED OBJECT DATA FROM THE MANAGED OBJECT DATABASE, THE MANAGED OBJECT DATA ASSOCIATED WITH AT LEAST ONE IDENTIFIER THAT CORRESPONDS TO AT LEAST ONE IDENTIFIER ASSOCIATED WITH THE MANAGED RESOURCE DATA RECEIVED FROM THE MANAGED RESOURCE

230 OBTAIN MANAGED OBJECT DATA FROM THE MANAGED OBJECT DATABASE, THE MANAGED OBJECT DATA ASSOCIATED WITH A LOGICAL PARTITION NUMBER THAT CORRESPONDS TO A LOGICAL PARTITION NUMBER ASSOCIATED WITH THE MANAGED RESOURCE DATA RECEIVED FROM THE MANAGED RESOURCE

OR

231 OBTAIN MANAGED OBJECT DATA FROM THE MANAGED OBJECT DATABASE, THE MANAGED OBJECT DATA ASSOCIATED WITH A RANGE OF IDENTIFIERS THAT CORRESPONDS TO A RANGE OF IDENTIFIERS ASSOCIATED WITH THE MANAGED RESOURCE DATA RECEIVED FROM THE MANAGED RESOURCE

*FIG. 10*

METHODS AND APPARATUS FOR SELECTING A READ MECHANISM

CONTINUATION-IN-PART CLAIM TO PRIORITY

This application is a continuation-in-part of, and claims the benefit of the filing date of co-pending U.S. application patent Ser. No. 11/476,478 filed Jun. 28, 2006 entitled "METHODS AND APPARATUS FOR STORING COLLECTED NETWORK MANAGEMENT DATA". The entire teachings and contents of this application are hereby incorporated by reference in their entirety.

BACKGROUND

The rapid expansion of information service and data processing industries has resulted in a need for computer systems to manage and store large amounts of data. As an example, financial service industry businesses such as banks, mutual fund companies or the like often operate complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Components of a typical conventional storage area network implementation include one or more connectivity devices such as high speed data switches that interconnect the various data storage systems to each other and to one or more host or server computer systems (servers) that require access to (e.g., read and/or write) the data in the data storage systems on behalf of client software applications and/or client computer systems to communicate with the servers. A SAN is thus a fabric that routes input/output requests in data access protocols such as SCSI, iSCSI, Fiberchannel, or others from servers through switches to one or more data storage systems for access to data stored in those storage systems.

A developer or administrator of a storage area network environment may install one or more distributed storage area network management software applications within the storage area network to manage or administer the various resources (i.e., devices, computer systems, storage systems, etc.) that operate within the storage area network. A network manager (i.e., a person) responsible for management of the storage area network operates the network management software application to perform management tasks such as performance monitoring, network analysis, remote configuration, storage provisioning and other administration of the various resources operating within the storage area network.

A typical conventional storage area network management software application may have several different software components or processes that execute independently of each other in a distributed manner on different computer systems but that collectively interoperate together to perform network management. As an example, conventional designs of storage area network management applications can include console, server, agent and storage or database management software components or processes that each performs a specific role in storage area network management.

Generally, the server component or process operates as a central control process within the storage area network management application and coordinates communication between the console, storage and agent components. The console component or process often executes within a dedicated storage area network management workstation to allow a network administrator (i.e., a person or people responsible for management of the storage area network) to visualize and remotely control and manage the various components within the storage area network that are displayed on a graphical user interface within a display on the console computer system. Agent components or processes execute on the various host computer systems such as servers distributed throughout the storage area network to manage various types of storage area network resources.

As an example, there may be different respective agents specifically designed (e.g., coded in software) to remotely manage, control and collect data from data storage system resources, database applications, switches, and so forth. Agents receive remote management commands from the server (i.e., via a user at the console controlling the server) and apply functionality associated with those management commands to the managed resources within the storage area network for which those agents are designated to manage. Agents are also responsible for periodically (e.g. nightly) collecting configuration or management data concerning the storage area network resources that those agents are responsible for managing. As an example, an agent that is responsible for monitoring and control of a large data storage disk array system might be configured to collect management data from that storage array on a nightly basis. This managed resource data collection process might include communicating with the storage array to query the array for information concerning all devices (e.g. logical storage devices) configured at that time within the array. This may result in the collection of large amounts of management data from certain managed SAN resources, such as large storage array in which there can be many thousands of devices configured for operation. The management data collected from the agent is also known as managed resource data.

Agents transmit this collected managed resource data back to an assigned storage component, also known as a store process. The store process receives the collected managed resource data from the agent and processes and stores this information into a storage area network management database for access by the server and console components. The management database thus provides managed object data (i.e., managed resource data that has been stored in the management database) for all managed resources in the SAN. The console component can interact with the server component to obtain current network information such as performance, capacity, load or other data concerning managed resources within the storage area network by accessing the managed object data maintained in this manner within the network management database.

The design of conventional network management applications often uses a large number of agent components that each remotely operate to periodically collect sets of management data from the managed resources that those agents manage. After collection, each agent is responsible for transmitting the collected set of management data to a store process that processes the management data for storage into a management database or other accessible management data repository. More specifically, an agent responsible to interact with that managed resource collects and forwards management data associated with that data storage system to the store process for placement into the management database.

A data management framework provides an efficient method for processing and storing network management data collected from a managed resource by an agent. The framework provides a set of adapter classes that allow store processing to efficiently process managed resource data collected from managed resources. During operation of the store process disclosed herein, the store process obtains managed resource data collected by an agent from a managed resource in a network and populates a set of adapters with the managed resource data. The store process determines the set of adapters to be instantiated from the managed resource data collected from the managed resource. In particular, the store process identifies and instantiates at least one type adapter associated with the managed resource data collected from the managed resource. As an example, the type adapter may correspond to a resource such as a storage array from which the managed resource data was collected.

For each type adapter, the framework provides instance adapters and the store process instantiates at least one associated instance adapter to contain managed resource data associated with that type adapter. In this manner, instance adapters operate as containers for the collected management data and are associated to type adapters that correspond to managed resources from which that managed resource data was collected. The store process can validate the data within the instance adapters to be certain that the data is complete for processing into a managed object database access by the network management application. By performing validation, the store process ensures that cumbersome database access operations are avoided in situations when managed resource data is corrupted or incomplete in some manner.

Assuming the validation succeeds, the store process begins the operation of storing the managed resource data as managed object data within the management database maintained by the network management application. To do so, based on the set of adapters populated with the managed resource data, the store process selects and applies a read mechanism to read corresponding managed object data from a management database into managed objects that are to be synchronized with the managed resource data collected from the managed resource.

Using the read mechanism, the store process reads from the management database and stores the managed object data read from the management database using the invoked read mechanism in a managed object structure for comparison with the managed resource data maintained in the instance adapters. Using the managed resource data being maintained in the instance adapters and the managed object data being maintained in memory from application of the read mechanism, the store process thereafter synchronizes the managed resource data populated in the set of adapters with the managed object data in the management database.

SUMMARY

Conventional mechanisms and techniques for managing the collection and processing of management data for managed resources by network management applications suffer from a variety of deficiencies. In particular, conventional techniques that read managed object data from a managed object database do so using a single read mechanism assumed to be the optimal method of obtaining managed object data from a managed object database. Conventional techniques do not evaluate conditions associated with the managed object data in order to select an optimized read process from a variety of different read processes or techniques such that the managed object data is efficiently obtained from a managed object database. As a result, conventional systems that use a single read technique to read data from a managed object database may be less efficient at database and memory utilization.

Embodiments disclosed herein operate to significantly overcome these and other deficiencies associated with conventional mechanisms and techniques for selecting read mechanisms for obtaining managed object data from a managed object database. In particular, embodiments disclosed herein provide a read mechanism selecting process that receives managed resource data (collected by an agent) from a managed resource, and based on conditions associated with the managed resource data (for example, whether the managed resource data contains a logical partition number that corresponds to a logical partition number associated with managed object data within the managed object database), selects and applies the read mechanism to the managed object data within the managed object database. Conditions associated with the managed resource data can include:

Whether the type adapter associated with the managed resource data is a foreign adapter or a domestic adapter Whether the managed object data is partitioned or not Whether the partitioned managed object data is logically partitioned or not Whether creation of an instance adapter is required in order to synchronize the managed resource data with the managed object data in the managed object database Whether a checksum is associated with the managed resource data or not;

Whether the checksum is a currently calculated checksum or a previously calculated checksum How the checksum compares to a checksum associated with corresponding managed object data in the managed object database.

Once the condition associated with the managed resource data has been evaluated, the appropriate read mechanism can be selected. The read mechanisms can include:

Reading managed object data from the managed object database based on a logical partition number Reading managed object data from the managed object database based on an identifier associated with a managed resource Reading managed object data from the managed object database based on a range of identifiers associated with a managed resource Reading managed object data from the managed object database based on a third party software application that provides the managed object data Reading managed object data from the managed object database based on other managed resources associated with the managed resource.

After the appropriate read mechanism has been selected and applied to the managed object data in the managed object database, the read mechanism selecting process synchronizes the managed object data from the managed object database with the managed resource data received from an agent.

The read mechanism selecting process receives managed resource data collected by an agent from a managed resource in a storage area network, and evaluates conditions associated with the managed resource data to select a read mechanism based on the conditions. The read mechanism selecting process then applies the read mechanism to read managed object data from the managed object database. The managed object data in the managed object database corresponds to the managed resource data received by the read mechanism selecting process. After application of the read mechanism, the read mechanism selecting process synchronizes the managed object data from the managed object database with the managed resource data collected from the managed resource.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by EMC, Inc., of Hopkinton, Mass.

BRIEF DESCRIPTION OF THE DRAWINGS

The foregoing and other objects, features and advantages disclosed herein will be apparent from the following more particular description of preferred embodiments disclosed herein, as illustrated in the accompanying drawings in which like reference characters refer to the same parts throughout the different views. The drawings are not necessarily to scale, with emphasis instead being placed upon illustrating the embodiments, principles and concepts disclosed herein.

FIG. 7 illustrates a flowchart of a procedure performed by the system of FIG. 1 when the read mechanism selecting process evaluates conditions associated with the managed resource data to select a read mechanism based on the conditions, and determines that the managed resource data, received from the agent, is comprised of a plurality of partitions.

FIG. 8 illustrates a flowchart of a procedure performed by the system of FIG. 1 when the read mechanism selecting process evaluates conditions associated with the managed resource data to select a read mechanism based on the conditions, and determines a type of an instance adapter.

FIG. 10 illustrates a flowchart of a procedure performed by the system of FIG. 1 when the read mechanism selecting process applies the read mechanism to read managed object data from the managed object database, the managed object data corresponding to the managed resource data.

DETAILED DESCRIPTION

Figure 1:
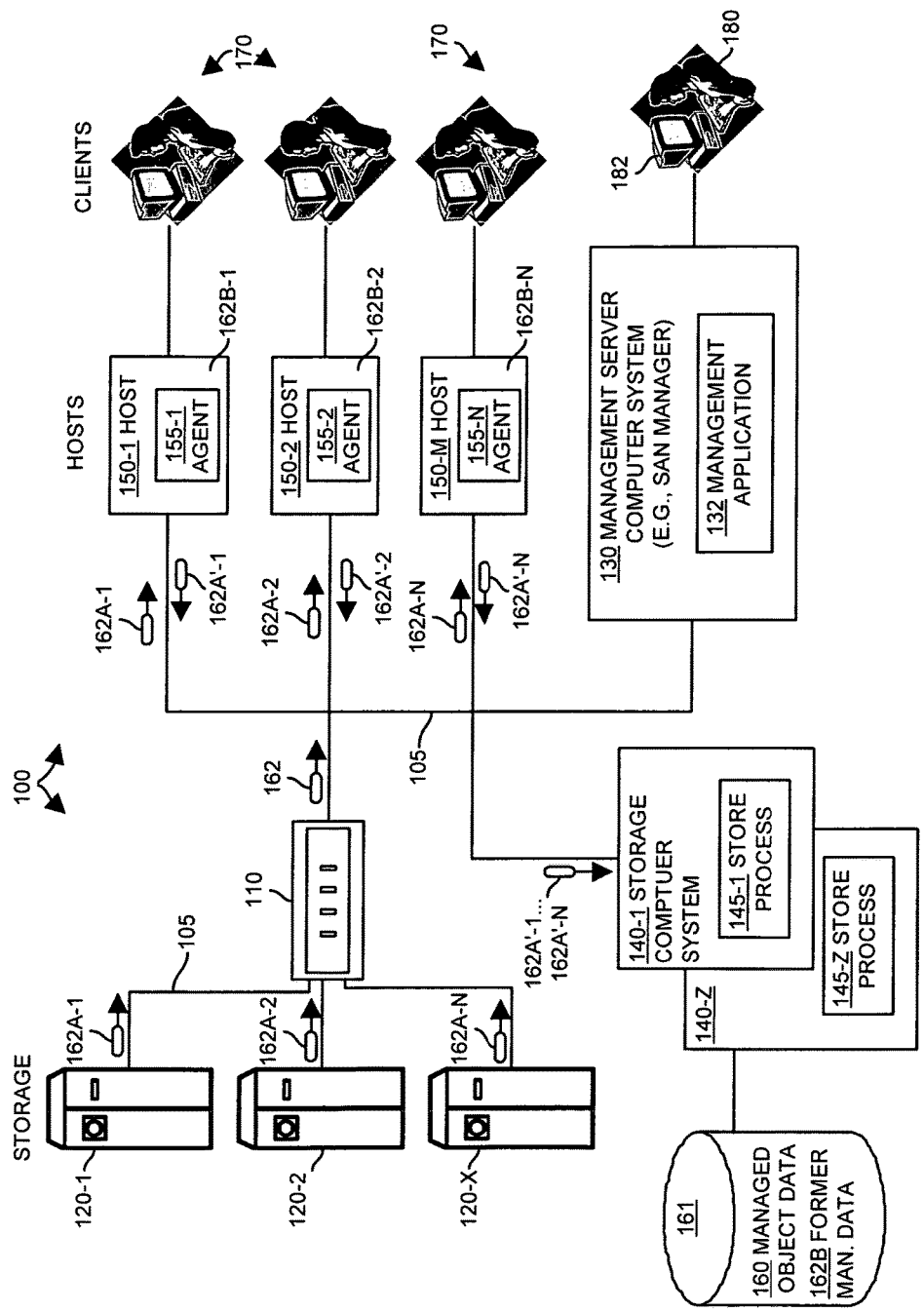
FIG. 1 illustrates an example storage area network and computing system environment including the read mechanism selecting process configured to operate according to embodiments disclosed herein.

Embodiments disclosed herein include methods and a computer system that perform a read mechanism selecting process within a data management framework. The read mechanism selecting process receives managed resource data (collected by an agent) from a managed resource, and based on conditions associated with the managed resource data (for example, whether the managed resource data contains a logical partition number that corresponds to a logical partition number associated with managed object data within the managed object database), selects and applies the read mechanism to the managed object data within the managed object database. Conditions associated with the managed resource data can include:

Whether the type adapter associated with the managed resource data is a foreign adapter or a domestic adapter Whether the managed object data is partitioned or not Whether the partitioned managed object data is logically partitioned or not Whether creation of an instance adapter is required in order to synchronize the managed resource data with the managed object data in the managed object database Whether a checksum is associated with the managed resource data or not;

Whether the checksum is a current checksum or a previously calculated checksum

How the checksum compares to a checksum associated with corresponding managed object data in the managed object database.

Once the condition associated with the managed resource data has been evaluated, the appropriate read mechanism can be selected. The read mechanisms can include:

Reading managed object data from the managed object database based on a logical partition number Reading managed object data from the managed object database based on an identifier associated with a managed resource Reading managed object data from the managed object database based on a range of identifiers associated with a managed resource Reading managed object data from the managed object database based on a third part software application that provides the managed object data Reading managed object data from the managed object database based on other managed resources associated with the managed resource.

After the appropriate read mechanism has been selected and applied to the managed object data in the managed object database, the read mechanism selecting process synchronizes the managed object data from the managed object database with the managed resource data received from an agent.

The read mechanism selecting process receives managed resource data collected by an agent from a managed resource in a storage area network, and evaluates conditions associated with the managed resource data to select a read mechanism based on the conditions. The read mechanism selecting process then applies the read mechanism to read managed object data from the managed object database. The managed object data in the managed object database corresponds to the managed resource data received by the read mechanism selecting process. After application of the read mechanism, the read mechanism selecting process synchronizes the managed object data from the managed object database with the managed resource data collected from the managed resource.

FIG. 1 illustrates an example of a networking environment suitable for use in explaining example embodiments. In this example, the networking environment is a storage area network 100 that includes a communications medium 105 that interconnects a plurality of data storage systems 120-1 through 120-X through one or more connectivity devices 110 (e.g., storage area network switches) to a plurality of host computer systems 150-1 through 150-M. According to the general operation of the storage area network shown in FIG. 1, client computer systems 170 can operate various client software applications (not specifically shown) that communicate with server applications (not specifically shown) operating within the host computer systems 150 in order to access data stored within the data storage systems 120 over the storage area network 100. The system disclosed herein is concerned with management of the various hosts 150, switches 110, and data storage systems 120 with a network management application 132 that includes store processes 145 and agent processes 155.

Figure 2:
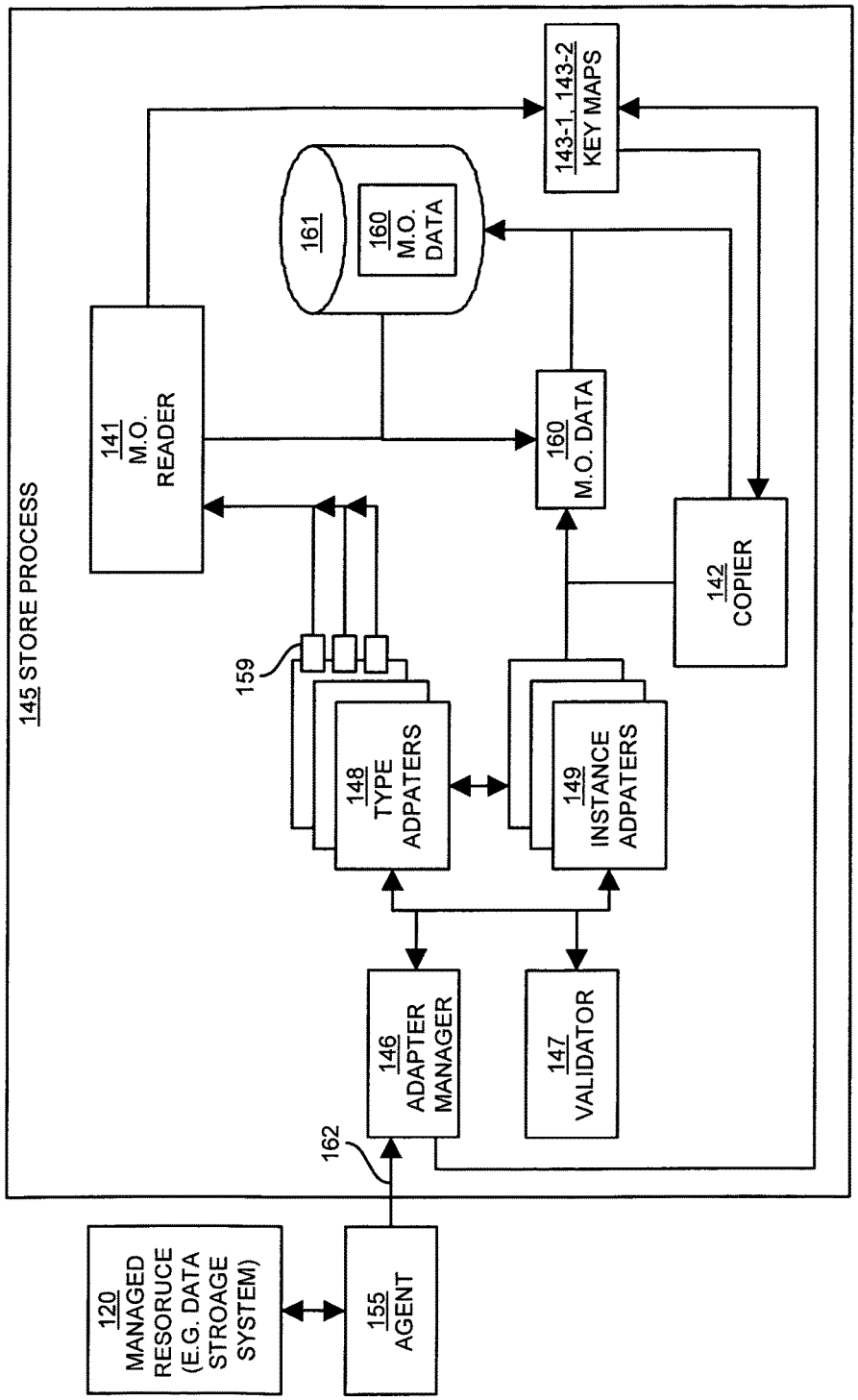
FIG. 2 illustrates an example architecture of a store process configured to operate according to embodiments disclosed herein.

More specifically, in this example storage area network 100 is a management server computer system 130 that operates the network management application 132. In addition, the storage area network 100 includes one or more storage computer systems 140-1 through 140-Z that operate respective store processes 145-1 through 145-Z configured in accordance with the framework disclosed herein. A plurality of agent software processes 155-1 through 155-N operate within one or more of the host computer systems 150-1 through 150-M to periodically collect managed resource data 162 from managed resources such as the data storage systems 120, connectivity device 110 and hosts 150 (or any other managed resources that may operate in the SAN 100. The agents 155 process the collected managed resource data 162 (e.g. to determine changes from the time of last collection) and then transmit the collected managed resource data 162 to the store processes 145. Generally, the agents 155 and store processes 145 interoperate with, and are collectively considered parts of the management application 132. A network administrator 180 interacts via a console computer system 182 with the management application 132 executing on the management server computer system 130 in order to remotely administer manageable entities within the storage area network 100 such as the data storage systems 120, the connectivity devices 110 and the host computer systems 150. Embodiments disclosed herein relate to the processing performed by the store processes 145 to collect and process managed resource data 162 collected by agents 155 from managed entities (e.g., 120 and/or 110 and others not specifically shown) for placement into the management database 161 as managed object data 160 for access by the management application 132. FIG. 2 illustrates a more detailed view of processing performed according to store processes 145.

FIG. 2 is a block diagram of an example store process 145 architecture that operates in accordance with example embodiments disclosed herein. Generally, as shown in this example, the agent 155 collects managed resource data 162 from a managed resource 120, that in this example is a storage array operating in a storage area network 100. The agent 155 transmits the managed resource data 162 to the store process 145 for receipt by an adapter manager 146. The managed resource data 162 may be encapsulated in a predefined data format. The adapter manager 146 is able to analyze the managed resource data 162 to identify which managed resource 120 the managed resource data 162 was collected from by the agent 155. From this analysis, the adapter manager 146 can instantiate a set of adapters including type adapters 148 and instance adapters 149 and can further instantiate the managed resource data 162 into appropriate instance adapters 149 as will be explained more detail. The type adapters 148 generally correspond to various resources for which the managed resource data 162 was collected in the instance adapters 149 serve as containers to maintain the specific contents, values or properties contained within the collected managed resource data 162 for those resources. During the process of populating the adapters with managed resource data 162, the adapter manager 146 creates an instance adapter map 143-1 to identify specific key information within fields of the managed resource data 162 that correspond to key information within managed object data 160 maintained in the management database 161.

After the adapter manager 146 has instantiated the appropriate type and instance adapters 148 and 149, the store process 145 operates a validator 147 to validate the data within the instance adapters 149. Validation ensures that the collected managed resource data 162 is process-able for storage within the managed object database 161. Validation can include insuring that all references within managed resource data 162 have corresponding adapters instantiated so that all relationships between fields of data are present. Assuming validation is successful (if it is not, the processing aborts), the store process 145 operates a managed object reader 141 to read managed object data 160 from the management database 161. During reading of the managed object data 160, the managed object reader 141 creates a managed object data key map 143-2 that identifies keys within specific managed object data 160. The managed object data 160 that is read from the management database 161 represents management data that is to be updated with the most recently collected managed resource data 162 that resides in the instance adapters 149.

After reading the managed object data 160, the store process 145 operates a copier 142 to associate the managed resource data 162 maintained within the instance adapters 149 with the managed object data 160 read from the management database 161. This processing uses the key maps 143-1 and 143-2 and can include creation of new managed objects data 160 or deletion of old managed objects data 160 that are no longer represented or reflected within the managed resource data 162 in the instance adapters 149. Additionally, the copier 142 establishes any required relationships and copies the properties of matching instance adapters 149 to the appropriate managed object data 160. The copier 142 accesses the maps 143 to complete this process. After the copy processes complete, the copier 142 causes the newly updated managed object data 160 (i.e., now updated with the managed resource data 162 in the store process 145) to be committed for storage within the management database 161. Further details of the processing in accordance with example embodiments will now be described in a series of flowcharts.

Figure 3:
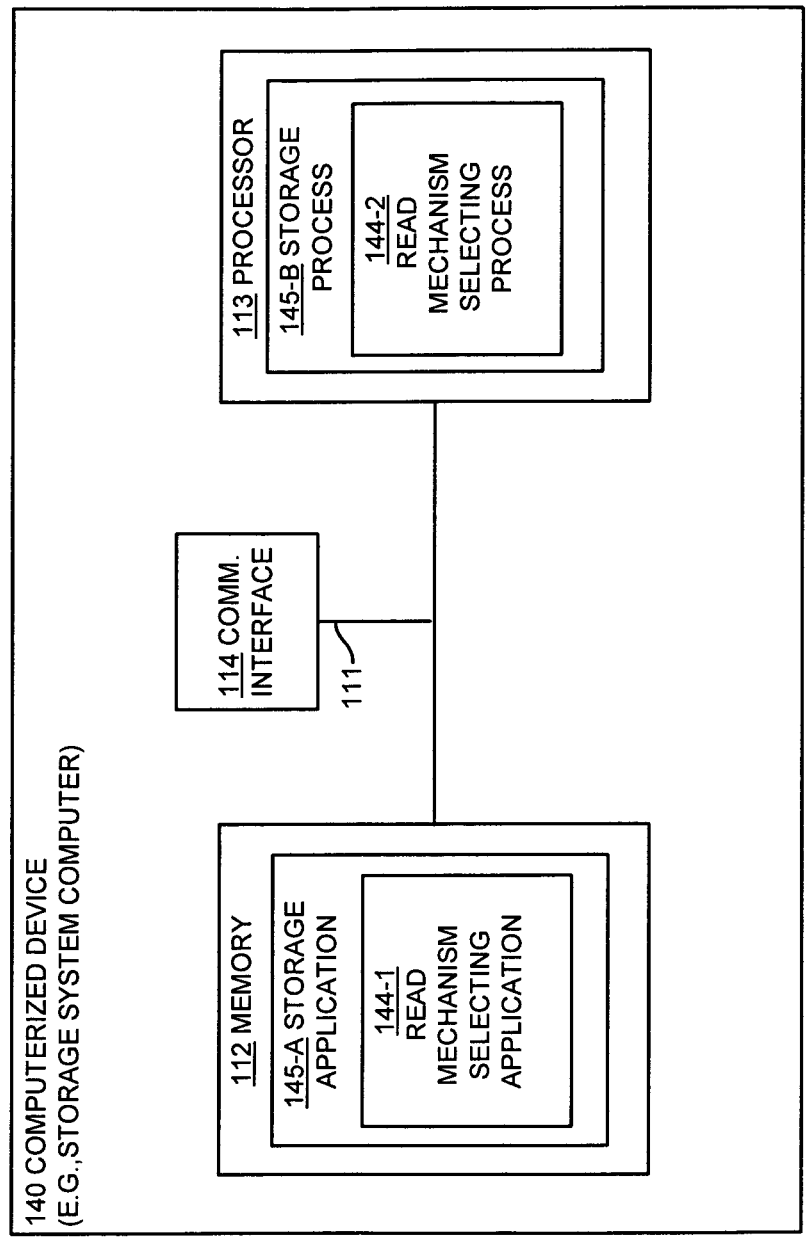
FIG. 3 illustrates an example computer system architecture for either a host computer system that operates an agent or a storage computer system that operates a read mechanism selecting process in accordance with embodiments disclosed herein.

FIG. 3 illustrates an example architecture of a computer system that is configured as a storage computer system 140. The computer system 140 may be any type of computerized system such as a personal computer, workstation, portable computing device, mainframe, server or the like. In this example, the computer system 140 includes an interconnection mechanism 111 that couples a memory system 112, a processor 113, and a communications interface 114. The communications interface 114 allows the computer systems 140 and 150 to communicate with each other over the storage area network 100.

The memory system 112 may be any type of computer readable medium that is encoded with an application 145-A containing a read mechanism selecting application 144-1 that represents software code such as data and/or logic instructions (e.g., stored in the memory or on another computer readable medium such as a disk) that embody the processing functionality of embodiments of the store process 145 as explained above. The processor 113 can access the memory system 112 via the interconnection mechanism 111 in order to launch, run, execute, interpret or otherwise perform the logic instructions of the application 145 (for the storage computer) in order to produce a corresponding store process 145-B containing a read mechanism selecting process 144-2. In other words, the store processes 145-B represents one or more portions of the storage application 145-A1 performing within or upon the processor 113 in the computer system.

Is to be understood that embodiments disclosed herein include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments disclosed herein can provide the applications operating within the processor 113 as the processes. While not shown in this example, those skilled in the art will understand that the computer system may include other processes and/or software and hardware components, such as an operating system, that have been left out of this illustration for ease of description.

Further details of configurations explained herein will now be provided with respect to a flow chart of processing steps that show the high level operations disclosed herein to perform the read mechanism selecting process 144-2.

Figure 4:
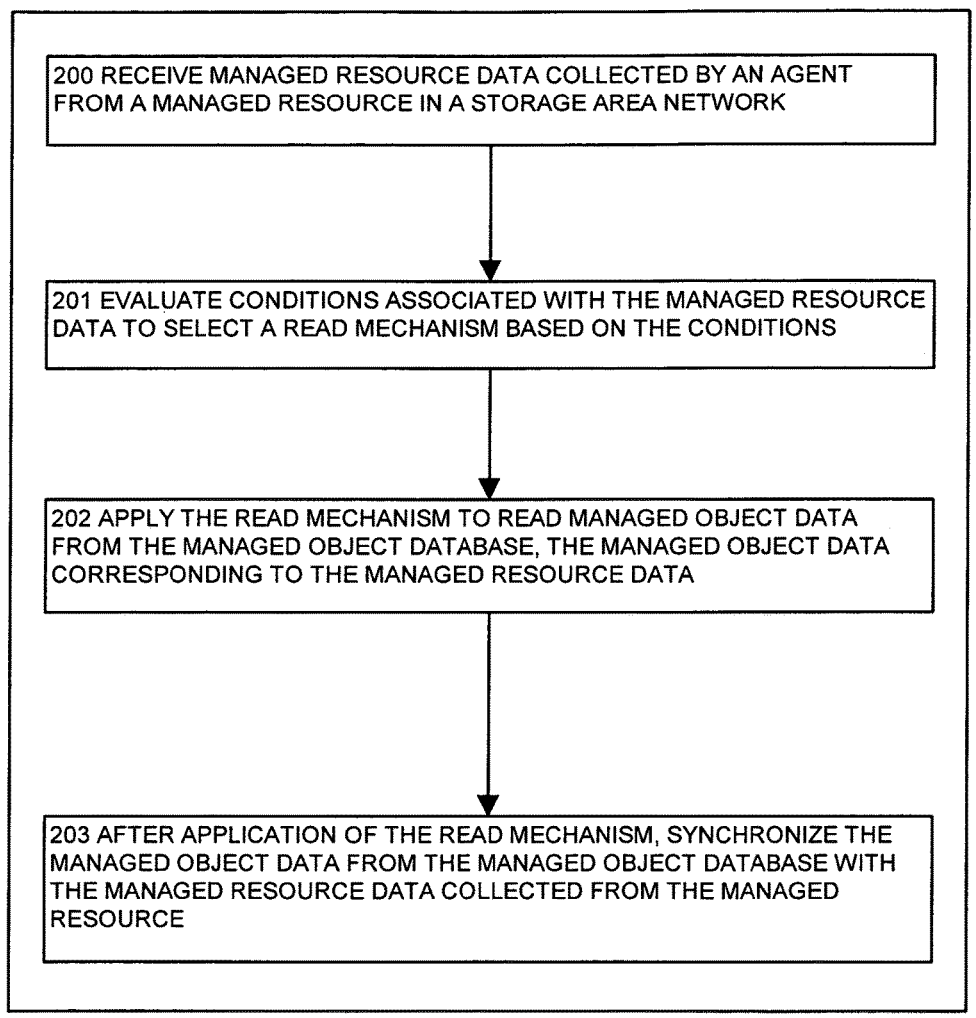
FIG. 4 illustrates a flowchart of a procedure performed by the system of FIG. 1 when the read mechanism selecting process receives managed resource data collected by an agent from a managed resource in a storage area network.

FIG. 4 is a flowchart of the steps performed by the read mechanism selecting process 144-2 when it receives managed resource data 162 collected by an agent 155 from a managed resource 120 in a storage area network.

In step 200, the read mechanism selecting process 144-2 receives managed resource data 162 collected by an agent 155 from a managed resource 120 in a storage area network. Agents 155 are responsible for periodically collecting configuration or resource management data 162 associated with managed resources 120 that those agents are responsible for managing. Agents 155 transmit the resource management data 162 back to an assigned storage component, also known as a store process 145.

In step 201, the read mechanism selecting process 144-2 evaluates conditions associated with the managed resource data 162 to select a read mechanism based on the conditions. The conditions can include, for example, whether the managed resource data 162 is partitioned, whether those partitions have logical partition numbers that correspond to logical partition number associated with managed object data 160 in the managed object database 161, etc.

In step 202, the read mechanism selecting process 144-2 applies the read mechanism to read managed object data 160 from the managed object database 161. The managed object data 160 corresponds to the managed resource data 162 collected by the agent 155. The read mechanism is applied to read managed object data 160 from the managed object database 161 so as to determine a changeset of data that will be modified as a result of updating the managed object database 161 with the managed resource data 162.

After application of the read mechanism, in step 203, the read mechanism selecting process 144-2 synchronizes the managed object data 160 from the managed object database 160 with the managed resource data 162 collected from the managed resource 120. The read mechanism selecting process 144-2 updates the managed object database 160 with the managed resource data 162.

Figure 5:
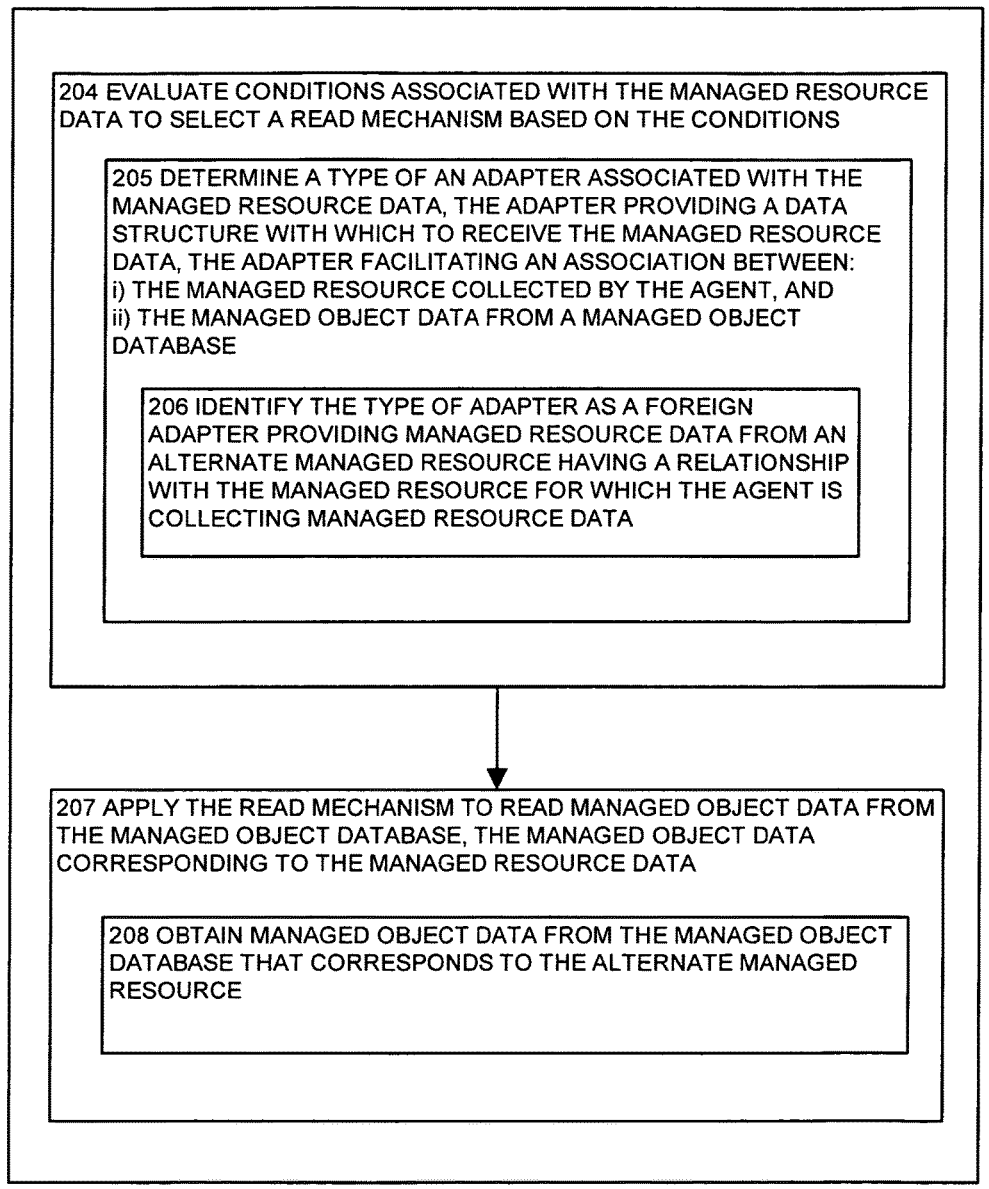
FIG. 5 illustrates a flowchart of a procedure performed by the system of FIG. 1 when the read mechanism selecting process evaluates conditions associated with the managed resource data to select a read mechanism based on the conditions.

FIG. 5 is a flowchart of the steps performed by the read mechanism selecting process 144-2 when it evaluates conditions associated with the managed resource data 162 to select a read mechanism based on the conditions.

In step 204, the read mechanism selecting process 144-2 evaluates conditions associated with the managed resource data 162 to select a read mechanism based on the conditions.

In step 205, the read mechanism selecting process 144-2 determines a type of an adapter 148 associated with the managed resource data 162. The adapter 148 provides a data structure with which to receive the managed resource data 162. The adapter 148 facilitates an association between:
  i) the managed resource data 162 collected by the agent 155, and
  ii) the managed object data 160 from a managed object database 161. The adapter 148 links the managed resource data 162 with the corresponding managed object data 160 within the managed object database 161.

In step 206, the read mechanism selecting process 144-2 identifies the type of adapter 148 as a foreign adapter 148-2, providing managed resource data 162 from an alternate managed resource 120-2 having a relationship with the managed resource 120-1 for which the agent 155 is collecting managed resource data 162. In an example embodiment, the agent 155 collects managed resource data 162-1 for a managed resource 120-1. The stores process creates an adapter 148-1 to handle the managed resource data 162-1 collected for the managed resource 120-1. In order to synchronize the managed resource data 162-1 with the managed object data 160 in the managed object database 161, the stores process creates foreign adapters 148-2 to handle managed resource data 162-2 (collected by the agent 155) that is associated with the managed resource data 162-1 collected from the managed resource 120-1.

In step 207, the read mechanism selecting process 144-2 applies the read mechanism to read managed object data 160 from the managed object database 161. The managed object data 160 corresponds to the managed resource data 162.

In step 208, the read mechanism selecting process 144-2 obtains managed object data 160 from the managed object database 161 that corresponds to the alternate managed resource 120-2. In an example embodiment, the read mechanism selecting process 144-2 identifies the adapter 148 as a foreign adapter 148, and selects a "read foreign" read mechanism on the managed object database 161 to obtain the managed object data 160 associated with the managed resource data 162 contained within the foreign adapter 148.

Figure 6:
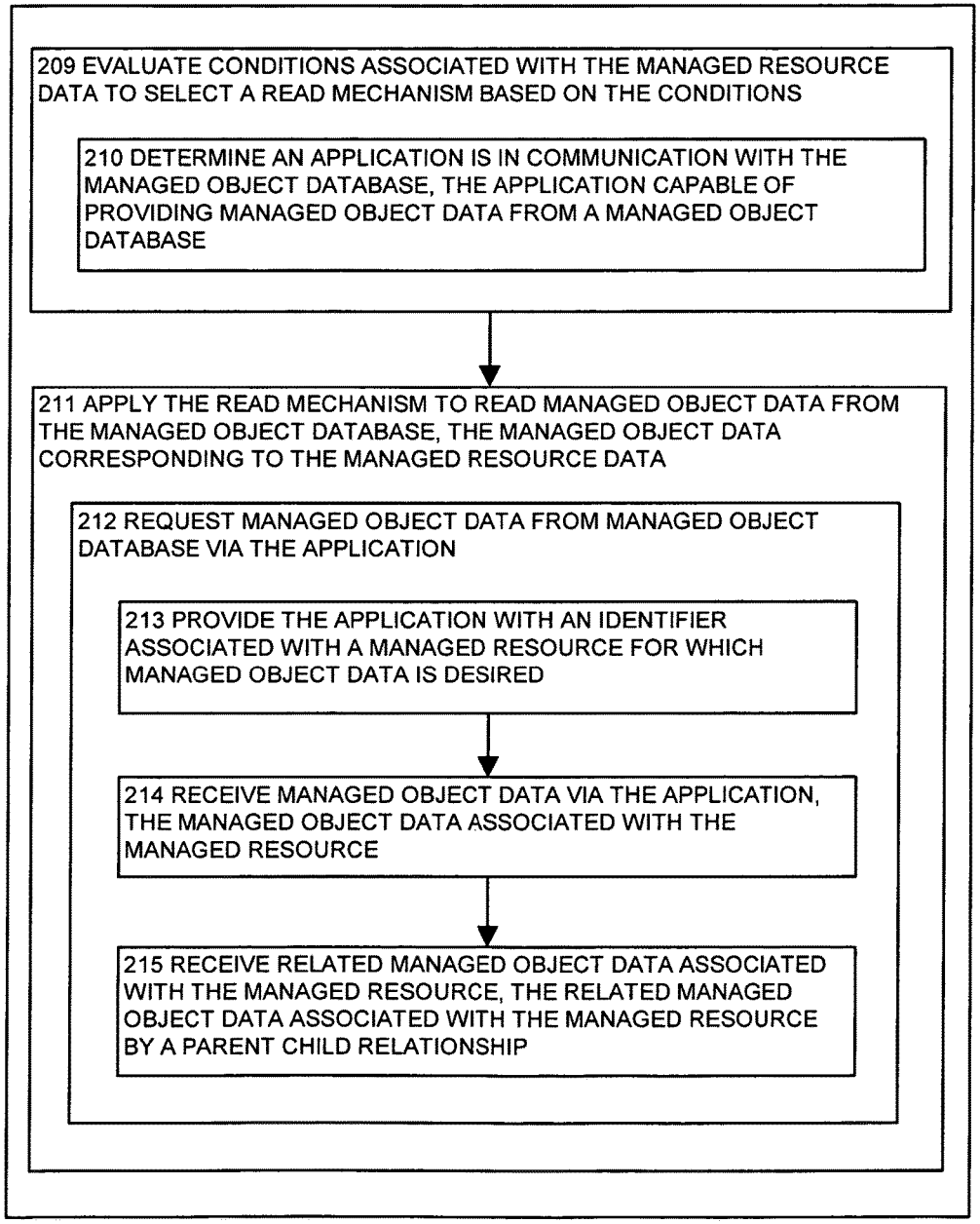
FIG. 6 illustrates a flowchart of a procedure performed by the system of FIG. 1 when the read mechanism selecting process evaluates conditions associated with the managed resource data to select a read mechanism based on the conditions, and determines an application is in communication with the managed object database.

FIG. 6 is a flowchart of the steps performed by the read mechanism selecting process 144-2 when it evaluates conditions associated with the managed resource data 162 to select a read mechanism based on the conditions.

In step 209, the read mechanism selecting process 144-2 evaluates conditions associated with the managed resource data 162 to select a read mechanism based on the conditions.

In step 210, the read mechanism selecting process 144-2 determines an application is in communication with the managed object database 161. The application is capable of providing managed object data 160 from a managed object database 161. In an example embodiment, the application is a third party software application capable of providing managed object data 160 from the managed object database 161.

In step 211, the read mechanism selecting process 144-2 applies the read mechanism to read managed object data 160 from the managed object database 161. The managed object data 162 corresponds to the managed resource data 162.

In step 212, the read mechanism selecting process 144-2 requests managed object data 160 from managed object database 161 via the application. The read mechanism selecting process 144-2 obtains the managed object data 160 directly (that corresponds to the managed resource data 162 received from the agent 155) from the third party software application using, for example, a "read from source" read mechanism.

In step 213, the read mechanism selecting process 144-2 provides the application with an identifier associated with a managed resource 120 for which managed object data 160 is desired. The identifier may be, for example, a key associated with the managed resource 120 that also corresponds to a key in the managed object database 161.

In step 214, the read mechanism selecting process 144-2 receives managed object data 160 via the application. The managed object data 160 is associated with the managed resource 120. In an example embodiment, a key is provided to the application, and the application returns managed object data 160 that is associated with that key.

In step 215, the read mechanism selecting process 144-2 receives related managed object data 160-2 associated with the managed resource 120. The related managed object data 160-2 is associated with the managed resource 120 by a parent child relationship. In an example embodiment, the managed resource 120-1 has a parent child relationship with an alternative managed resource 120-2 where the managed resource 120-1 is the parent to the child managed resource 120-2. The read mechanism selecting process 144-2 performs, for example, a "read from source" read mechanism on the application, and receives the managed object data 160-1 associated with the managed resource 120-1 as well as any related managed object data 160-2 associated with a related managed resource 120-2 (that as a parent child relationship with the managed resource 120-1). In an example embodiment, the "read from source" read mechanism receives an identifier associated with the managed resource 120-1, and iteratively determines all related managed resources 120-X for which the managed object database 161 contains managed object data 160-2. The application then returns the managed object data 160-X associated with those related managed resources 120-X as well as the managed object data 160-1 associated with the managed resource 120-1.

FIG. 7 is a flowchart of the steps performed by the read mechanism selecting process 144-2 when it evaluates conditions associated with the managed resource data 162 to select a read mechanism based on the conditions.

In step 216, the read mechanism selecting process 144-2 evaluates conditions associated with the managed resource data 162 to select a read mechanism based on the conditions.

In step 217, the read mechanism selecting process 144-2 determines that the managed resource data 162, received from the agent 155, is comprised of a plurality of partitions. In an example embodiment, the managed resource data 162 is comprised of a plurality of partitions, due to the overall size of the managed resource data 162.

In step 218, the read mechanism selecting process 144-2 identifies that each of the plurality of partitions has an associated logical partition number.

In step 219, the read mechanism selecting process 144-2 identifies that the managed object data 160 within the managed object database 161 has a logical partition number that corresponds to the logical partition number associated with each of the plurality of partitions. In an example embodiment, if the managed resource data 162 (containing a plurality of partitions containing logical partition numbers) has previously synchronized with the managed object data 160 in the managed object database 161, the read mechanism selecting process 144-2 can obtain the managed object data 160 from the managed object database 161 using the logical partition number via a read mechanism, such as a "read logical partition" read mechanism. If the managed resource data 162 (containing a plurality of partitions containing logical partition numbers) has not previously synchronized with the managed object data 160 in the managed object database 161 (i.e., the first time the managed resource data 162 is synchronized w/ the managed object database 161), the read mechanism selecting process 144-2 must select a different read mechanism with which to synchronize the managed resource data 162 w/ the managed object database 161.

FIG. 8 is a flowchart of the steps performed by the read mechanism selecting process 144-2 when it evaluates conditions associated with the managed resource data 162 to select a read mechanism based on the conditions.

In step 220, the read mechanism selecting process 144-2 evaluates conditions associated with the managed resource data 162 to select a read mechanism based on the conditions.

In step 221, the read mechanism selecting process 144-2 determines a type of an instance adapter 149. The instance adapter is associated with an adapter associated with the managed resource data 162, and operates as a container for the managed resource data 162.

In step 222, the read mechanism selecting process 144-2 identifies the type of instance adapter 149 as an additional instance adapter 149. The additional instance adapter 149 operates as a container for additional managed resource data 162-2 required for synchronization of the managed object data 160 from the managed object database 161 with the managed resource data 162-1 collected from the managed resource 120-1.

Figure 9:
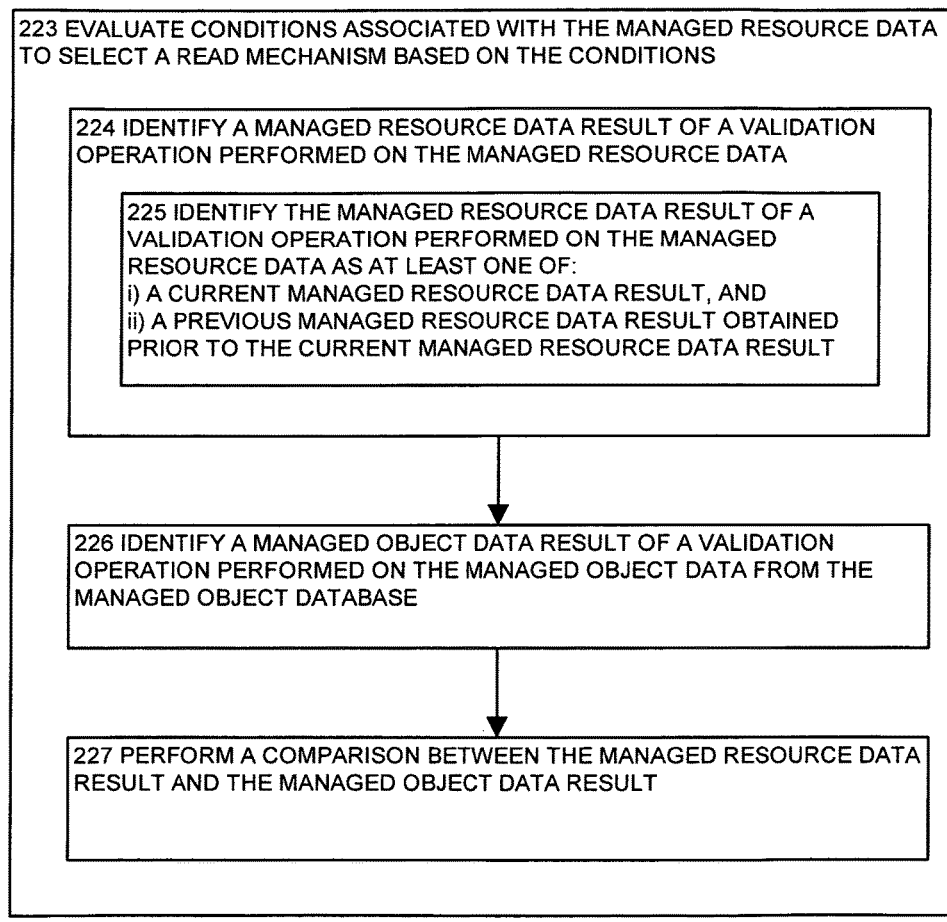
FIG. 9 illustrates a flowchart of a procedure performed by the system of FIG. 1 when the read mechanism selecting process evaluates conditions associated with the managed resource data to select a read mechanism based on the conditions, and identifies a managed resource data result of a validation operation performed on the managed resource data.

FIG. 9 is a flowchart of the steps performed by the read mechanism selecting process 144-2 when it evaluates conditions associated with the managed resource data 162 to select a read mechanism based on the conditions.

In step 223, the read mechanism selecting process 144-2 evaluates conditions associated with the managed resource data 162 to select a read mechanism based on the conditions.

In step 224, the read mechanism selecting process 144-2 identifies a managed resource data result of a validation operation performed on the managed resource data 162. In an example embodiment, the validation operation is a checksum performed on a data structure containing the managed resource data 162. In another embodiment, the checksum can also be performed on each adapter 148 associated with the data structure.

In step 225, the read mechanism selecting process 144-2 identifies the managed resource data result of a validation operation performed on the managed resource data as at least one of:
 i) a current managed resource data result, and
 ii) a previous managed resource data result obtained prior to the current managed resource data result.

In step 226, the read mechanism selecting process 144-2 identifies a managed object data result of a validation operation performed on the managed object data 160 from the managed object database 161. In an example embodiment, the managed resource data 162 has a checksum and the managed object data 160 has a checksum.

In step 227, the read mechanism selecting process 144-2 performs a comparison between the managed resource data result and the managed object data result. In an example embodiment, if a checksum exists for the managed resource data 162, the read mechanism selecting process 144-2, performs a comparison between the checksum for the managed object database 161, and the checksum for the managed resource data 162 (i.e., either a current managed resource data result, or a previous managed resource data result).

FIG. 10 is a flowchart of the steps performed by the read mechanism selecting process 144-2 when it applies the read mechanism to read managed object data 160 from the managed object database 161. The managed object data 160 corresponds to the managed resource data 162.

In step 228, the read mechanism selecting process 144-2 applies the read mechanism to read managed object data 160 from the managed object database 161. The managed object data 160 corresponds to the managed resource data 162.

In step 229, the read mechanism selecting process 144-2 obtains managed object data 160 from the managed object database 161. The managed object data 160 is associated with at least one identifier that corresponds to at least one identifier associated with the managed resource data 162 received from the managed resource 120. In an example embodiment, the read mechanism selecting process 144-2 obtains managed object data 160 from the managed object database 161 by performing a database retrieval request (such as a SQL command) using an managed resource 120 identifier, such as a key associated with the managed resource 120 or a serial number associated with the managed resource 120.

In step 230, the read mechanism selecting process 144-2 obtains managed object data 160 from the managed object database 161. The managed object data 160 associated with a logical partition number that corresponds to a logical partition number associated with the managed resource data 162 received from the managed resource 120. In an example embodiment, if the managed resource data 162 does not represent a first time attempt to synchronize managed resource data 162 associated with a managed resource 120, the read mechanism selecting process 144-2 obtains managed object data 160 from the managed object database 161 that is associated with a logical partition number that corresponds to a logical partition number associated with the managed resource data 162.

In step 231, the read mechanism selecting process 144-2 obtains managed object data 160 from the managed object database 161. The managed object data 160 is associated with a range of identifiers that corresponds to a range of identifiers associated with the managed resource data 162 received from the managed resource 120. In an example embodiment, the read mechanism selecting process 144-2 obtains managed object data 160 from the managed object database 161 by performing a database retrieval request (such as a SQL command) using a range of managed resource 120-X identifiers, such as a range of serial numbers associated with a range of managed resources 120-X for which the agent 155 provided managed resource data 162-N.

Other alternative arrangements disclosed herein include rearranging the processing steps explained above in the flow charts in such a way that the overall effect disclosed herein is the same. It is to be thus understood by those skilled in the art that the particular arrangement of processing steps in many instances does not specify implementation of embodiments disclosed herein. As such, those skilled in the art of software development and computer-related technologies will understand that there can be many ways and orders of representing the processing operations explained above and such alternative software code will still achieve the overall effects explained herein. In addition, embodiments disclosed herein are not limited to operation on the computer systems shown above. The agents, store processes and management server (including change manager) can operate on shared computing resources, or can be distributed among any number of computer systems. Furthermore, embodiments disclosed herein are not limited to operation in a storage area network management application, but are intended to be generally applicable to any type of network management application. Accordingly, embodiments disclosed herein are not limited to the processing arrangements explained above.

Other arrangements of embodiments disclosed herein that are disclosed herein include software programs to perform the method embodiment steps and operations summarized above and disclosed in detail below for the store process. More particularly, a computer program product is disclosed that has a computer-readable medium including computer program logic encoded thereon that when performed in a computerized device provides a associated operations of the store process, as explained herein. The computer program logic, when executed on at least one processor with a computing system, causes the processor to perform the operations (e.g., the methods) indicated herein as embodiments disclosed herein. Such arrangements disclosed herein are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments disclosed herein.

Software processes that operate in a collection of computerized devices, such as in a group of storage area network management servers, hosts or other entities can also provide the system disclosed herein. The system disclosed herein can be distributed between many software processes on several computers, or all processes such as the agent and store process could execute on a small set of dedicated computers, or on one computer alone. Though preferred embodiments provide the agent and store process execute on separate computer systems, the particular distribution of the agent and store process is not intended to be limiting.

It is to be understood that the system disclosed herein can be embodied strictly as a software program, as software and hardware, or as hardware alone. Example embodiments disclosed herein may be implemented within EMC's Control Center software application that provides management functionality for storage area network resources and in computerized devices that operate the Control Center software. Control Center is manufactured by EMC Corporation of Hopkinton, Mass., USA.

What is claimed is:

1. A method for selecting a read mechanism with which to read managed object data from a managed object database, the method comprising:
   receiving a managed resource data transmission comprising managed resource data collected by an agent from a managed resource in a storage area network and transmitted via a data access protocol, wherein the manage resource is selected from the group consisting of a data storage system, a connectivity device and a host;
   evaluating the managed resource data to select the read mechanism from a plurality of read mechanisms based on one or more conditions, wherein the conditions are selected from an adapter type, a partition type, and a checksum, further wherein evaluating based on the condition of the partition type includes identifying that each of a plurality of partitions has an associated logical partition number, and identifying that the managed object data within the managed object database has a logical partition number that corresponds to the logical partition number associated with each of the plurality of partitions; and
   based on the evaluating the managed resource data, applying the read mechanism selected from the plurality of read mechanisms to read the managed object data from the managed object database, the managed object data corresponding to the managed resource data.

2. The method of claim 1 further comprising:
   after application of the read mechanism, synchronizing the managed object data from the managed object database with the managed resource data collected from the managed resource.

3. The method of claim 1 wherein evaluating conditions associated with the managed resource data to select a read mechanism based on the conditions comprises:
   determining a type of an adapter associated with the managed resource data, the adapter providing a data structure with which to receive the managed resource data, the adapter facilitating an association between:
   i) the managed resource data collected by the agent; and
   ii) the managed object data from a managed object database.

4. The method of claim 1 wherein evaluating conditions associated with the managed resource data to select a read mechanism based on the conditions comprises:
   determining an application is in communication with the managed object database, the application capable of providing managed object data from a managed object database; and
   wherein applying the read mechanism to read managed object data from the managed object database comprises:
   requesting managed object data from managed object database via the application.

5. The method of claim 4 wherein requesting managed object data from managed object database via the application comprises:
   providing the application with an identifier associated with a managed resource for which managed object data is desired; and
   receiving managed object data via the application, the managed object data associated with the managed resource.

6. The method of claim 5 comprising:
   receiving related managed object data associated with the managed resource, the related managed object data associated with the managed resource by a parent child relationship.

7. The method of claim 1 wherein evaluating conditions associated with the managed resource data to select a read mechanism based on the conditions comprises:
   determining a type of an instance adapter, the instance adapter associated with an adapter associated with the managed resource data, the instance adapter operating as a container for the managed resource data.

8. The method of claim 7 wherein determining a type of an instance adapter comprises:
   identifying the type of instance adapter as an additional instance adapter operating as a container for additional managed resource data required for synchronization of the managed object data from the managed object database with the managed resource data collected from the managed resource.

9. The method of claim 1 wherein evaluating conditions associated with the managed resource data to select a read mechanism based on the conditions comprises:
   identifying a managed resource data result of a validation operation performed on the managed resource data.

10. The method of claim 9 wherein identifying a managed resource data result of a validation operation performed on the managed resource data comprising:

identifying the managed resource data result of a validation operation performed on the managed resource data as at least one of:
i) a managed resource data current result; and
ii) a managed resource data previous result obtained prior to the managed resource data current result.

11. The method of claim 9 wherein comprising:
identifying a managed object data result of a validation operation performed on the managed object data from the managed object database; and
performing a comparison between the managed resource data result and the managed object data result.

12. The method of claim 1 wherein applying the read mechanism to read managed object data from the managed object database comprises:
obtaining managed object data from the managed object database, the managed object data associated with at least one identifier that corresponds to at least one identifier associated with the managed resource data received from the managed resource.

13. The method of claim 12 wherein obtaining managed object data from the managed object database comprises:
obtaining managed object data from the managed object database, the managed object data associated with a logical partition number that corresponds to a logical partition number associated with the managed resource data received from the managed resource.

14. The method of claim 12 wherein obtaining managed object data from the managed object database comprises:
obtaining managed object data from the managed object database, the managed object data associated with a range of identifiers that corresponds to a range of identifiers associated with the managed resource data received from the managed resource.

15. A computerized device comprising: a memory;
a processor;
a communications interface; and
an interconnection mechanism coupling the memory, the processor and the communications interface;
wherein the memory is encoded with a read mechanism selecting application that when executed on the processor is capable of selecting read mechanisms on the computerized device by performing the operations of:
receiving a managed resource data transmission comprising managed resource data collected by an agent from a managed resource in a storage area network and transmitted via a data access protocol, wherein the manage resource is selected from the group consisting of a data storage system, a connectivity device, and a host;
evaluating the managed resource data to select the read mechanism from a plurality of read mechanisms based on one or more conditions, wherein the conditions are selected from an adapter type, a partition type, and a checksum, further wherein evaluating based on the condition of the partition type includes identifying that each of a plurality of partitions has an associated logical partition number, and identifying that the managed object data within the managed object database has a logical partition number that corresponds to the logical partition number associated with each of the plurality of partitions; and
based on the evaluating the managed resource data, applying the read mechanism to read managed object data from the managed object database, the managed object data corresponding to the managed resource data.

16. A non-transitory computer readable storage medium encoded with computer programming logic that when executed on a process in a computerized device provides data management framework implementation, the medium comprising:
instructions for receiving a managed resource data transmission comprising managed resource data collected by an agent from a managed resource in a storage area network and transmitted via a data access protocol, wherein the manage resource is selected from the group consisting of a data storage system, a connectivity device and a host;
instructions for evaluating the managed resource data to select a read mechanism from a plurality of read mechanisms based on one or more conditions, wherein the conditions are selected from an adapter type, a partition type, and a checksum, further wherein evaluating based on the condition of the partition type includes identifying that each of a plurality of partitions has an associated logical partition number, and identifying that the managed object data within the managed object database has a logical partition number that corresponds to the logical partition number associated with each of the plurality of partitions; and
based on the evaluating the managed resource data, instructions for applying the read mechanism to read managed object data from the managed object database, the managed object data corresponding to the managed resource data.

17. The method of claim 3 wherein determining a type of an adapter associated with the managed resource data comprises:
identifying the type of adapter as a foreign adapter providing managed resource data from an alternate managed resource having a relationship with the managed resource for which the agent is collecting managed resource data; and
wherein applying the read mechanism to read managed object data from the managed object database comprises:
obtaining managed object data from the managed object database that corresponds to the alternate managed resource.

* * * * *